United States Patent [19]

Passamante et al.

[11] Patent Number: 5,077,699

[45] Date of Patent: Dec. 31, 1991

[54] DIGITAL BOTTOM MAPPING

[75] Inventors: Anthony P. Passamante, Oreland; Paul A. Labonski, Levittown; Nancy J. Harned, Ambler; Timothy B. Hediger, Lansdale, all of Pa.; John Ambrose, Mount Holly, N.J.

[73] Assignee: The United States of America as represented by the Secretary of the Navy, Washington, D.C.

[21] Appl. No.: 624,014

[22] Filed: Dec. 7, 1990

[51] Int. Cl.$^5$ .............................................. G01S 15/00
[52] U.S. Cl. ..................................................... 367/88
[58] Field of Search ........................................ 367/88

[56] References Cited

U.S. PATENT DOCUMENTS 4,207,620  6/1980  Morgara ................................. 367/88
4,561,076  12/1985  Gritzch ................................. 367/88
4,939,700  6/1990  Breton ................................... 367/88

*Primary Examiner*—Daniel T. Pihulic

*Attorney, Agent, or Firm*—James V. Tura; James B. Bechtel; Susan E. Verona

[57] ABSTRACT

Ocean bottom mapping is carried out by projecting a sonic pulse in the form of a fan-shaped beam from a vessel toward the ocean floor, receiving echoes by an array of sonic detectors extending athwartship, repeatedly taking instantaneous, simultaneous, snapshot-like samples of all of the detectors in the array, and, by means of a digital computer, applying a beam-forming transform, such as a Fast Fourier Transform, to the samples, thereby producing a spectrum of amplitudes versus angles. The directions of the floor areas from which the snapshot data emanate are determined from refinement of the peaks in the spectrum of amplitudes, and the distances of the same floor areas from the vessel are determined by the time interval between the pulse and the sample. A bottom profile is constructed from the directions and distances so determined. Two alternative techniques for refining and interpreting spectrum data are described.

27 Claims, 5 Drawing Sheets

DIGITAL BOTTOM MAPPING

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

This invention relates generally to oceanography, and more particularly to a digital method and apparatus for generating a contour map of the ocean floor using acoustic pulses.

The invention has utility in the generation of oceanographic data for both naval and civilian purposes, and particular utility in the analysis of ocean bottom topology in the search for petroleum and other natural resources.

Currently, there are many ways in which a map of the contour of the ocean bottom can be generated from reflections of acoustic pulses. One such system, offered by General Instrument, Inc. of Westwood, Mass., is known as SEA BEAM. In typical ocean surveying systems, such as SEA BEAM, a high intensity acoustic pulse (typically using a carrier of 12 Khz.) is directed toward the ocean bottom. By measuring the angle of acoustic reflections off the ocean bottom, and their delay times, the system is able to construct a depth profile. In general, in these prior systems, the direction of a returning acoustic pulse is determined by establishing a set of predetermined angular intervals, using beam-forming techniques at the receiving sensor or sensors. The direction of the arriving pulse is determined by the particular beam in which its amplitude is greatest.

U.S. Pat. Nos. 4,207,620 and 4,561,076 are examples of typical ocean bottom scanning systems.

U.S. Pat. No. 4,207,620 describes an oceanographic mapping using a wide-swath beam athwartship beam in which beam-forming is carried out at the receiver by multiple transducers and delay lines. The beams are formed successively by steering the transducer array by control of the delay lines.

U.S. Pat. No. 4,561,076 describes a sonar method and apparatus for mine detection in which a narrow, fan shaped transmitting beam is transmitted from a vessel located forward and to one side of a receiving vessel and at a predetermined height from the bottom. A beam former is used together with an echo equalizer which associates the echoes with the reflection centers from which they have been generated. The echo equalizer associates time windows with the receiving sectors established by the beam former.

Prior systems capable of producing ocean bottom maps with high resolution and accuracy are comparatively expensive. They are also slow and expensive to operate, since they provide high resolution only over a comparatively narrow area of the ocean bottom.

SUMMARY OF THE INVENTION

The principal object of this invention is to provide a method by which ocean bottom contour maps can be more efficiently produced using digital computer processing. Among the other objects of the invention are: the achievement of wider area coverage in each pass of the surveying vessel; improved accuracy in bottom coordinate determination; improved resolution and greater detail in the bottom contour map; greater speed of operation; and reduction of the cost of equipment as well as the cost of operation.

These objects are addressed in accordance with the invention by a digital mapping method which comprises the following steps. First, a sonic pulse is projected toward the floor of a body of water, from a vessel proceeding in a first direction. The pulse is projected in a wide swath, fan-shaped beam having a wide dimension in a direction transverse to said first direction, and having a narrow dimension in direction of movement of the vessel. The pulse insonifies an elongated narrow area of the floor extending in both the port and starboard directions relative to the vessel. The sonic pulse comprises multiple oscillations taking place continuously over a short pulse interval so that, for each pulse, two insonified spots move outward in the narrow area, in port and starboard directions respectively. An echo of the pulse is received by an array of sonic detectors propelled along with the vessel and arranged in a series along a line transverse to the direction of movement of the vessel. During the return of the echo of the pulse to the array of sonic detectors, sets of simultaneous, instantaneous samples of outputs of said sonic detectors are taken repeatedly. Each set of samples is derived from backscattered energy emanating from limited areas within the narrow area on the floor of the body of water, on the port and starboard sides of the vessel. The sample for each detector consists of a representation of the amplitude of the echo, as received by the detector, at an instant of time. By applying a beam-forming transform to each set of samples, the directions of the pair of limited areas on said floor are determined relative to the detector array. Then, for each set of samples, the time interval between the projection of the sonic pulse into the body of water and the return of the echo of the sonic pulse to the detector array is determined. Finally, coordinates of the limited areas corresponding to each set of samples are calculated from the directions and time interval determined for the set.

Further details, objects, advantages and novel features of the invention will become apparent from the following detailed description of the invention when considered in conjunction with the accompanying drawings.

DETAILED DESCRIPTION

Figure 1:
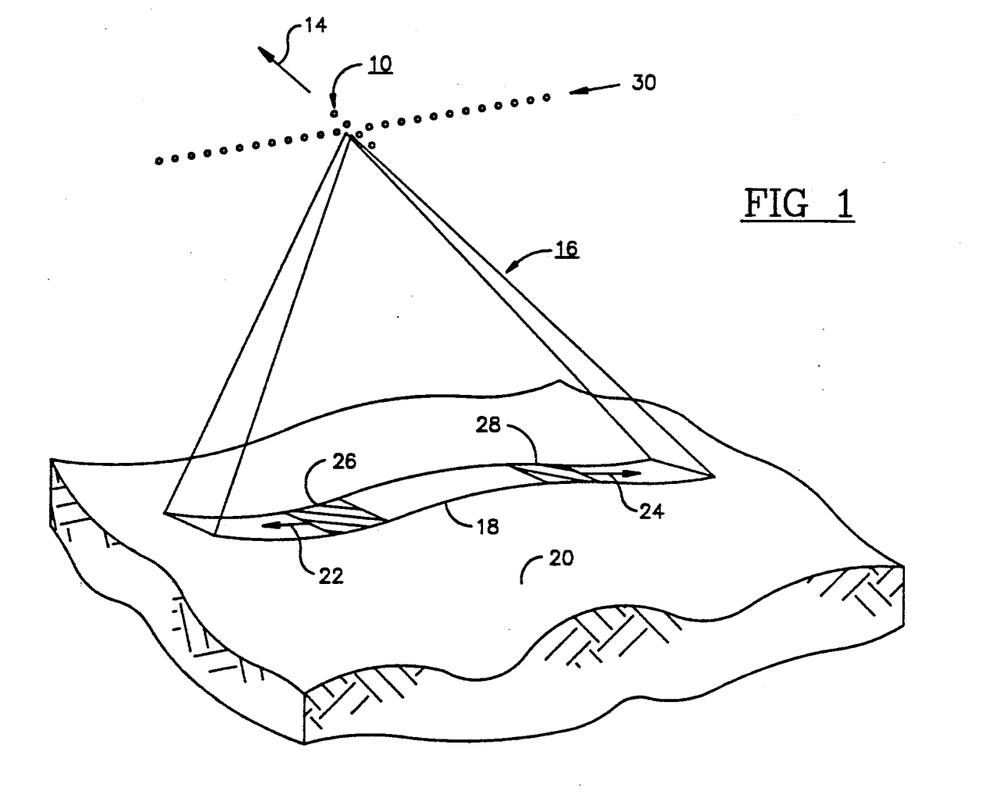
FIG. 1 is a schematic diagram showing shipboard pulse generating and receiving transducer arrays in accordance with the invention, and illustrating the manner in which insonified spots move outward in a narrow area of the ocean bottom.

FIG. 1 shows an array 10 of sonic projectors extending in the direction of movement of the surveying vessel (not shown) as indicated by arrow 14. The sonic projector array 10, is energized electrically in order to produce a sonic pulse, or "ping", consisting of multiple oscillations at a frequency typically 12 KHz. The duration of the sonic pulse is short, typically 7 milliseconds. The phases of the driving signals for the projectors in the array are adjusted to produce a downwardly directed beam 16 which is narrow in the direction of movement of the vessel, so that the acoustic energy transmitted by the projector array 10 is concentrated in a narrow strip 18 on ocean floor 20.

Because the sonic pulse has a curved wavefront, it nominally reaches the ocean floor at a location directly below the vessel, and then moves out along the ocean floor in a narrow strip 18 in both port and starboard directions, as indicated by arrows 22 and 24. Because the sonic pulse is of short duration, two insonified spots 26 and 28, having relatively short dimensions in the port and starboard directions, move out in opposite directions. Reflections are continuously radiated upward from spots 26 and 28 as they move outward in strip 18.

FIG. 1 also shows an array 30 of sonic detectors extending in a line transverse to the direction of movement of the vessel. In a typical array, the number of sonic detectors is 144, and the detectors are spaced from one another by a distance of 2.4 inches, so that the entire array is approximately 28.6 feet long in the port-starboard direction.

Since the transmitted pulse is relatively short in duration, and the outward moving insonified spots are of correspondingly short dimensions in their directions of movement, it is possible to determine the directions of the insonified spots relative to the vessel (in terms of angle relative to a vertical line centered on the vessel) by digital processing of the outputs of the sonic detectors. To accomplish this, repeated instantaneous samples of the outputs of all of the detectors in array 30 are taken as the insonified spots 26 and 28 move across the ocean floor. Each sample is, in effect, a "snapshot" of all 144 detector outputs. The snapshots are taken in rapid succession, e.g. at 3 millisecond intervals.

Figure 2:
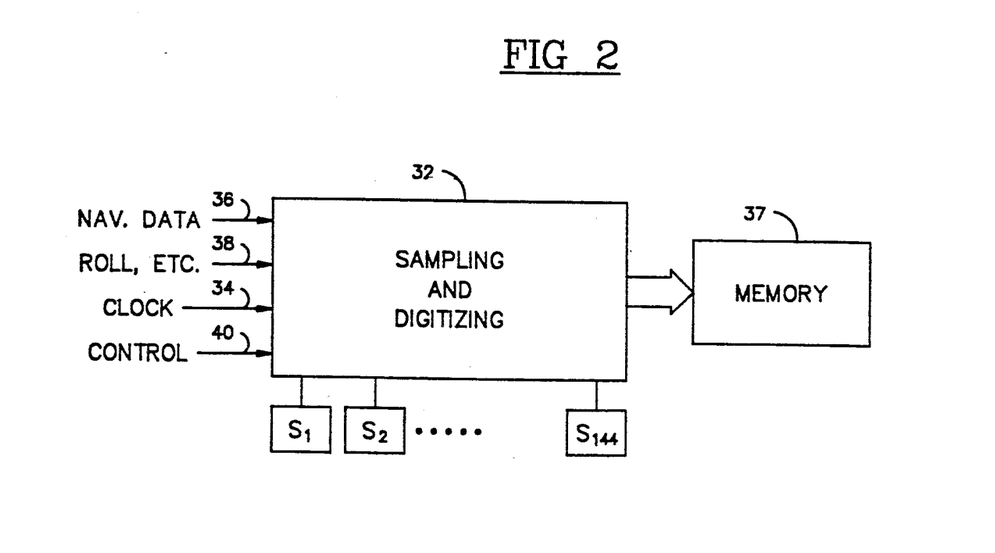
FIG. 2 is a schematic block diagram illustrating an apparatus for sampling and digitizing the outputs of the sonic detector array.

Referring to FIG. 2, the sonic detector array 30 comprises a set of sonic detectors labelled $S_1$ through $S_{144}$. In order to reduce the effects of background noise, each of the analog outputs of detectors $S_1$ through $S_{144}$ is translated to baseband and low-pass filtered. The translation produces a complex analog output. A sampling and digitizing apparatus 32 receives the analog outputs of the sonic detectors. A clock input 34 enables the sampling and digitizing apparatus to take instantaneous samples of the outputs of all 144 detectors repeatedly, for example every three milliseconds. These analog samples are digitized by A/D converters and converted to complex numbers containing both amplitude and phase information for each one of the 144 samples. The complex number for each sensor is transferred to computer memory 37 along with satellite navigational data at input 36, and roll, pitch, heading and heave data at input 38. The data at inputs 36 and 38 provide information on the instantaneous position of the vessel at the time each snapshot is taken. A control input 40 t..is the sampling and digitizing apparatus when a new pulse has been transmitted by the sonic projector array.

Figure 3:
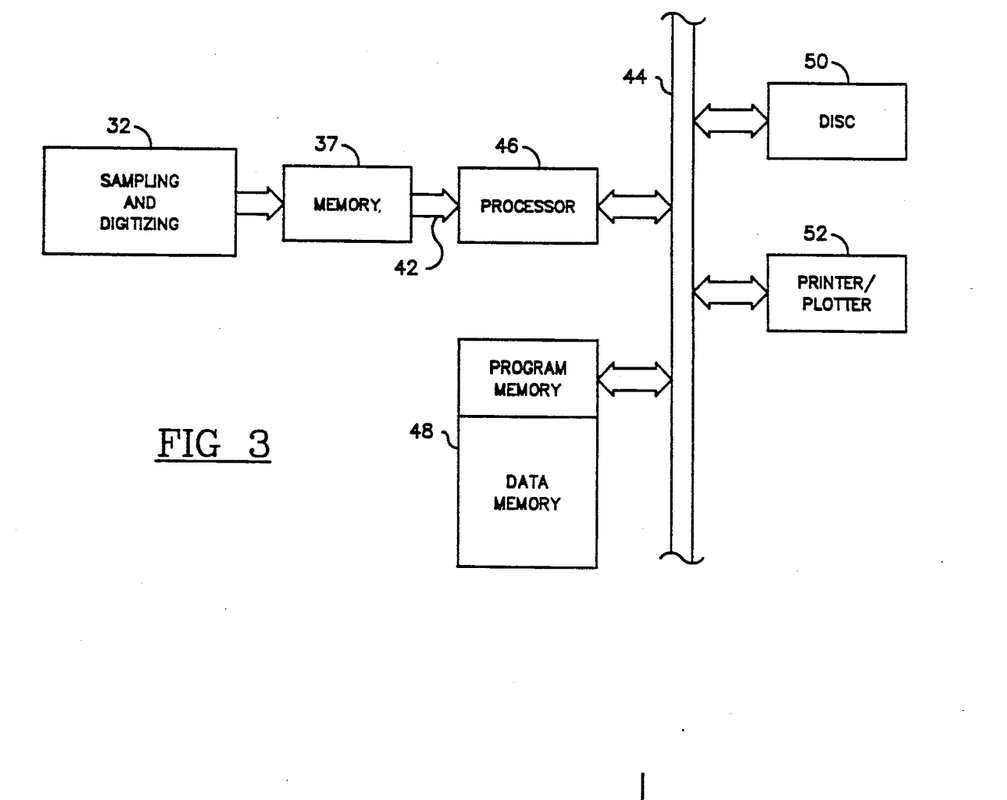
FIG. 3 is a schematic block diagram illustrating an apparatus for digitally processing the sampled and digitized outputs of the sonic detector array.

Processing of the data derived from the sampling and digitizing apparatus is carried out by a digital computer, and normally takes place after a complete "ping" of data has been transferred to memory 37. In FIG. 3, memory 37 is connected through a bus 42 to a digital processor 46. A memory 48, connected to the processor through bus 44, comprises a program memory and a data memory. A magnetic disc memory 50 and a printer or plotter 52 are also provided on bus 44.

The processor executes a program stored in memory 48 to carry out a set of program steps, two alternatives for which will be described below. Each snapshot is processed to obtain an instantaneous pair of directions for each of the two outward moving insonified spots 26 and 28 in FIG. 1. When all of the snapshots for a given sonic pulse have been processed to determine directions, further processing takes place in the computer of FIG. 3 to produce a bottom profile for that set of snapshots.

Figure 4:
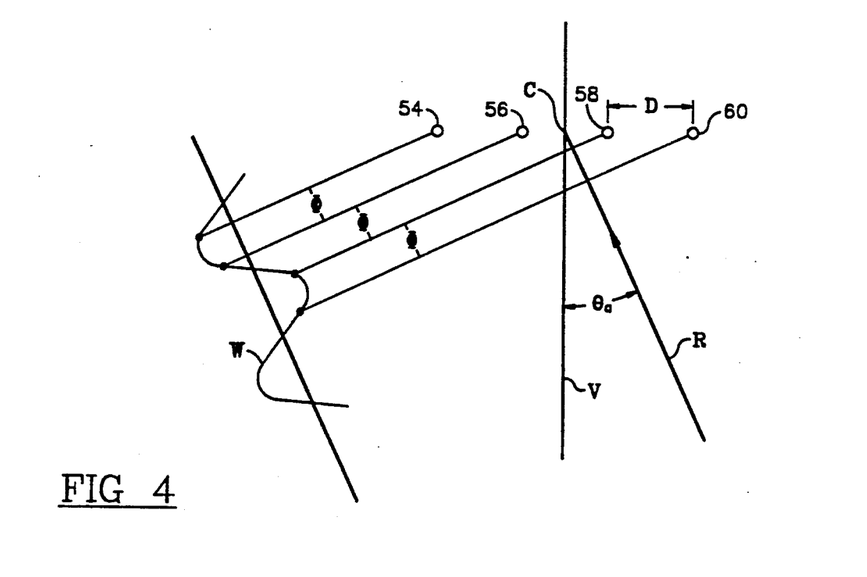
FIG. 4 is a schematic illustration of the receiving array and wavefronts emanating from an insonified spot at an angle $\theta_a$.

The principle by which the direction of an insonified spot on the ocean bottom is determined is illustrated in FIG. 4, wherein a simplified array, consisting of sonic detectors 54, 56, 58 and 60, is situated at a distance above the ocean bottom. The center C of the array is midway between detectors 56 and 58, and directions will be assumed to be measured from the center of the array.

For each ping, at least one insonified spot moves out along the ocean floor, as illustrated in FIG. 1. For each ping, at any instant of time during a finite time interval, each of the acoustic sensors 54, 56, 58 and 60 is energized by the 12 KHz. acoustic pulse backscattered from the insonified spot at a specific location on the ocean floor in a direction R at a specific angle $\theta_a$ measured relative to a vertical line V. The phase delay $\Phi$ between adjacent sensors is constant for that instant of time, and is proportional to the sine of $\theta_a$, so that:

$$\Phi = \frac{D}{\lambda} \sin\theta_a$$

where:
D is the distance between adjacent sensors;
$\lambda$ is the wavelength of the 12 KHz. acoustic pulse in water; and
$\theta_a$ is the angle swept out between a ray pointing to the insonified spot and a ray directed to the nadir directly beneath the receiving array.

As the insonified spot moves out, the phase delay $\Phi$ increases, remaining proportional to $\sin \theta_a$.

At any instant, the set of values at the sensors is itself a waveform W which exhibits the characteristic of a sampled sinusoid of normalized frequency $f_n$. Because of the geometry of the receiving array with respect to the returning acoustic pulse, $f_n$ corresponds to the phase delay $\Phi$. That is, the frequency of waveform W, as perceived by the sensors, is zero for an acoustic pulse arriving vertically, and approaches a maximum as the angle of arrival of the acoustic pulse approaches 90°. In an ideal environment, where there is no noise and all echoes emanate from the far field, Fourier analysis of this waveform yields an easily recognizable spike within a bin corresponding to $f_n$. Under non-ideal conditions, additional processing is necessary to estimate $f_n$ correctly. The angle $\theta$ can be determined using the estimate of $f_n$ and the relationship $$f_n = \Phi = \frac{D}{\lambda} \sin\theta_a$$

It is possible to calculate $\theta$ from the instantaneous detector array data by means of the Discrete Fourier Transform, and specifically by the use of the Fast Fourier Transform (FFT), which can be implemented easily in a digital computer. Determining the direction $\theta$ from the perceived wavefront spacing is analogous to the transforming from the time domain to the frequency domain. In the conventional time domain to frequency domain tranformation, a time-varying function is transformed into a frequency spectrum. In calculating the direction $\theta$, the space-varying detector array data are transformed into a spectrum of amplitudes versus angles. The invention utilizes this transformation, and provides a means for analyzing the spectrum produced thereby to obtain information on the ocean bottom profile.

Figure 5:
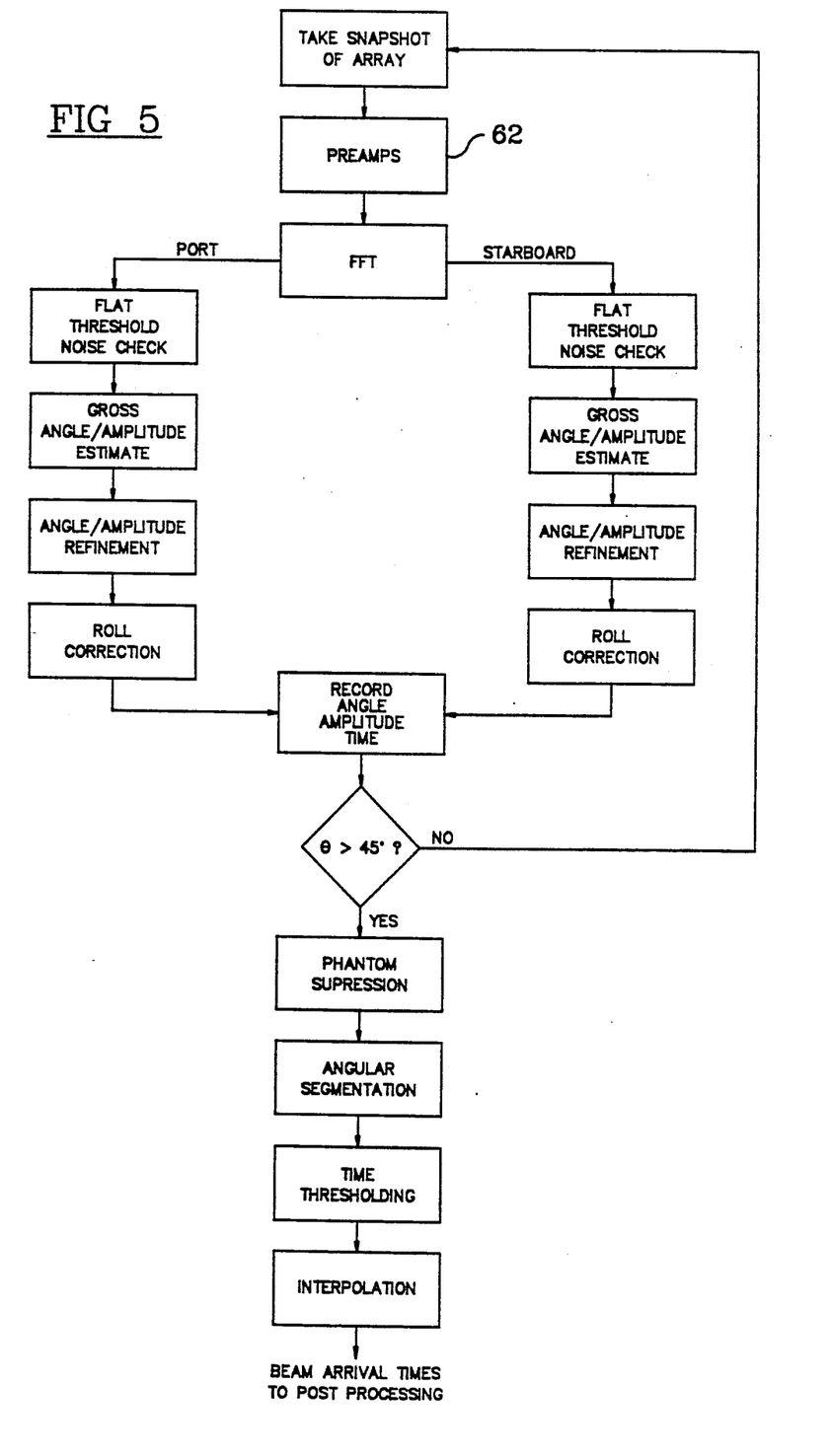
FIG. 5 is a flow diagram illustrating one method of processing the sampled and digitized outputs of the sonic detector array.

Referring now to the flow chart of FIG. 5, the snapshot data, consisting of 144 complex numbers, one for each sonic detector, is amplified by preamplification stage 62.

Figure 6:
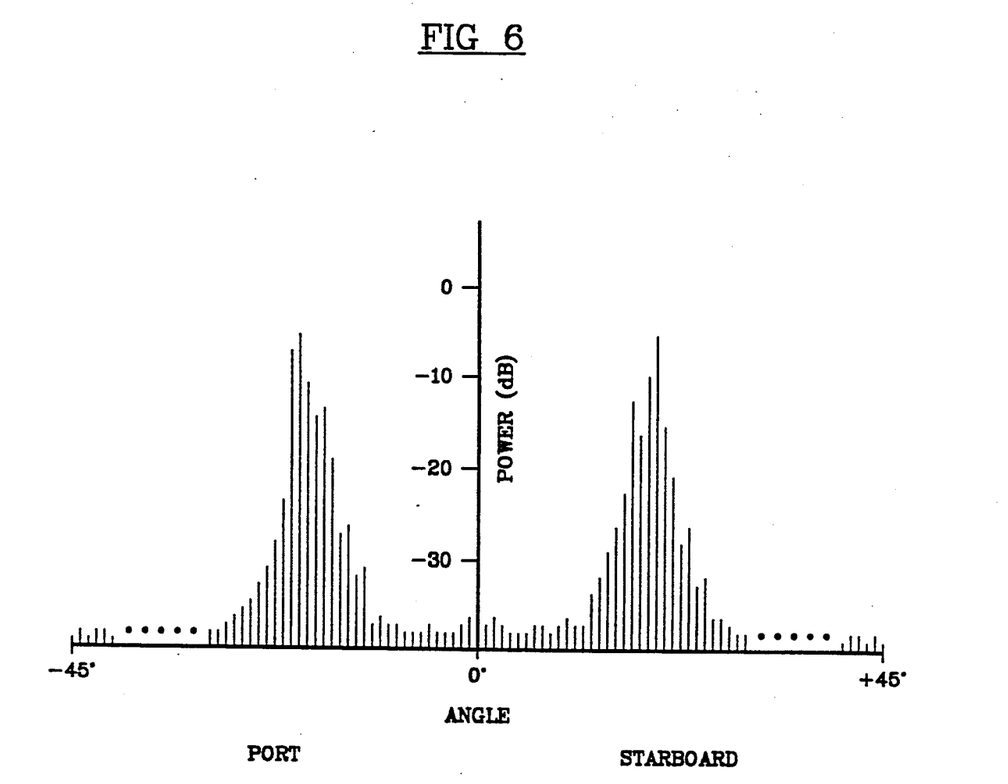
FIG. 6 is a diagram showing a typical plot of amplitude vs. angle, as derived by the beam-forming transform.

The snapshot data is transformed digitally to a spectrum representing the distribution of power across a 90° range of angles from −45° (port) to +45° (starboard). This is carried out in the processor, using the Fast Fourier Transform (FFT). The snapshot data consists of 144 points. To these are appended 112 points evaluated at zero, for a total of 256 or $2^8$ points. This makes the number of data points compatible with a 256 point Fast Fourier Transform. A typical spectrum derived through the FFT is depicted in FIG. 6. It should be understood that the entire spectrum derived through the FFT comprises a set of 256 discrete amplitude values, each corresponding to the amount of relative power received from separate angular subranges or "bins" within ±90° with respect to the vertical line perpendicular to the detector array. Only the ±45° range is of interest, however.

The FFT is a digitally implemented version of the discrete Fourier transform, which, as applied to the snapshot data, is as follows:

$$F\left(\frac{L}{\lambda}\sin\theta_d\right) = \frac{1}{N}\sum_c x\left(\frac{2\pi}{L}lc\right)e^{-\kappa\frac{2\pi}{L}lc\left(\frac{L}{\lambda}\sin\theta_d\right)}$$

where: L is the array length;
$\lambda$ is the wavelength of sound in water;
$\theta_d$ is the angle of arrival;
l is the intersensor distance;
c is the sensor index; and
lc is the sensor location along the array.

The spectrum produced by the FFT is divided into its port and starboard components, which are processed separately.

The first step in the further processing of the spectrum is a FLAT THRESHOLD NOISE CHECK, in which a threshold is established to distinguish signals of interest from noise. If, in the portion of interest in the spectrum, no peak exists which is significantly above the noise level, there is no point in attempting further processing of the data. The threshold is established by taking the sum of the squares of the magnitudes of the amplitudes within the port and starboard ranges respectively, and multiplying the sum by a constant. The individual amplitudes are then compared with the threshold, and the entire port or starboard portion of the snapshot is discarded if none of the amplitudes exceeds the threshold. Since port and starboard data are processed separately, it is possible for snapshot data on one side to be discarded, while data on the other side, from the same snapshot, is accepted and sent on for further processing.

Following the noise check, a GROSS ANGLE/AMPLITUDE ESTIMATE is made on each side of the spectrum. On each side of the spectrum which has been found to contain a signal, the bin having the highest amplitude is selected and determined to correspond to the direction of the insonified area of interest. The direction of the insonified area is now resolved to the width of one bin, which typically ranges from about ½° to about 2°, depending on its direction from the detector array.

Further resolution of the angular direction of the insonified area is achieved by an ANGLE/AMPLITUDE REFINEMENT step in which the direction is determined more precisely by interpolation, using the amplitudes in adjacent bins. On each side of the spectrum, the amplitude in the bin having the maximum amplitude is compared with the amplitudes in the adjacent bins on both sides thereof. The direction of a point within the insonified area on the ocean floor is determined with greater precision than the bin width by positioning the true direction within a bin having the maximum amplitude on the side of the center of the bin toward the one of the adjacent bins having the greater amplitude. This interpolation is possible because, in a Fourier transform, it is known that a signal, from a point source in the far field, arriving at a given angle $\theta$, will produce a distribution having the form $\sin\theta/\theta$. If the true peak is centered in a bin of the FFT, the amplitudes produced by the signal in the adjacent bins will have a known relationship to the amplitude of the true peak. If the true peak is to one side or the other of the center of its bin, the relationship of the amplitudes in the bin containing the true peak to the amplitudes in adjacent bins changes predictably. Using this relationship, it is possible to determine the true position and magnitude of the peak by appropriately weighting the amplitudes in these adjacent bins.

Following the refinement step, a ROLL CORRECTION step is carried out to compensate for the effect of ship's roll on the detected angular direction for each snapshot. Roll data is recorded in memory 37 along with the snapshot data from the 144 detectors, as shown in FIG. 2. The roll angle is added to each of the angles corresponding to the peaks in the FFT spectrum.

After roll correction is accomplished, the refined angles for each snapshot are recorded along with the amplitudes of the peaks and the time at which the snapshot was taken in a RECORD ANGLE AMPLITUDE TIME step.

As mentioned previously, snapshots are taken repeatedly, e.g. every three milliseconds. Each snapshot is processed in the manner depicted in FIG. 5, until the insonified spots have moved out beyond the 45° limits on either side of the vessel. Then, all of the snapshot data is accumulated and a PHANTOM SUPPRESSION step is carried out. The purpose of the phantom suppression step, is to eliminate false bottoms such as might result from backscatter from thermoclines. False bottoms are characterized by sudden decreases in the detected angle when proceeding from earlier to later snapshots corresponding to a given transmitted pulse. When such a sudden decrease in the detected angle occurs and it exceeds a predetermined amount, e.g. 20°, the data for all preceding snapshots is discarded, and the succeeding snapshots are processed as representing the true bottom.

Following phantom suppression, ANGULAR SEGMENTATION takes place. Here, the ±45° angular range is equally divided into 360 segments each having a width of ¼°. Each set of computed angles, amplitudes and return times is categorized in accordance with which ¼° wide segment the set's angular value best matches. For example, a set with an angle value of 30.40° is placed into a segment corresponding to the angular range 30.25°–30.50°.

Following angular segmentation, a TIME THRESHOLDING step determines which set of values from within each segment best represents that segment. This is done by choosing the set having the highest amplitude component. The remaining sets of data within the segment are discarded.

Following time thresholding, an INTERPOLATION step is executed in order to determine 91 beam arrival times, one for each degree of angle in the ±45° range, including 0°. With a beam arrival time determined for each ¼° segment, the four closest points in angle are determined for each beam. Then, by means of linear interpolation, an arrival time is determined for each beam.

Finally, in a post-processing step, ranges are determined from the beam arrival times, and the ranges and angular directions are converted to cartesian coordinates so that a bottom profile can be plotted.

Figure 7:
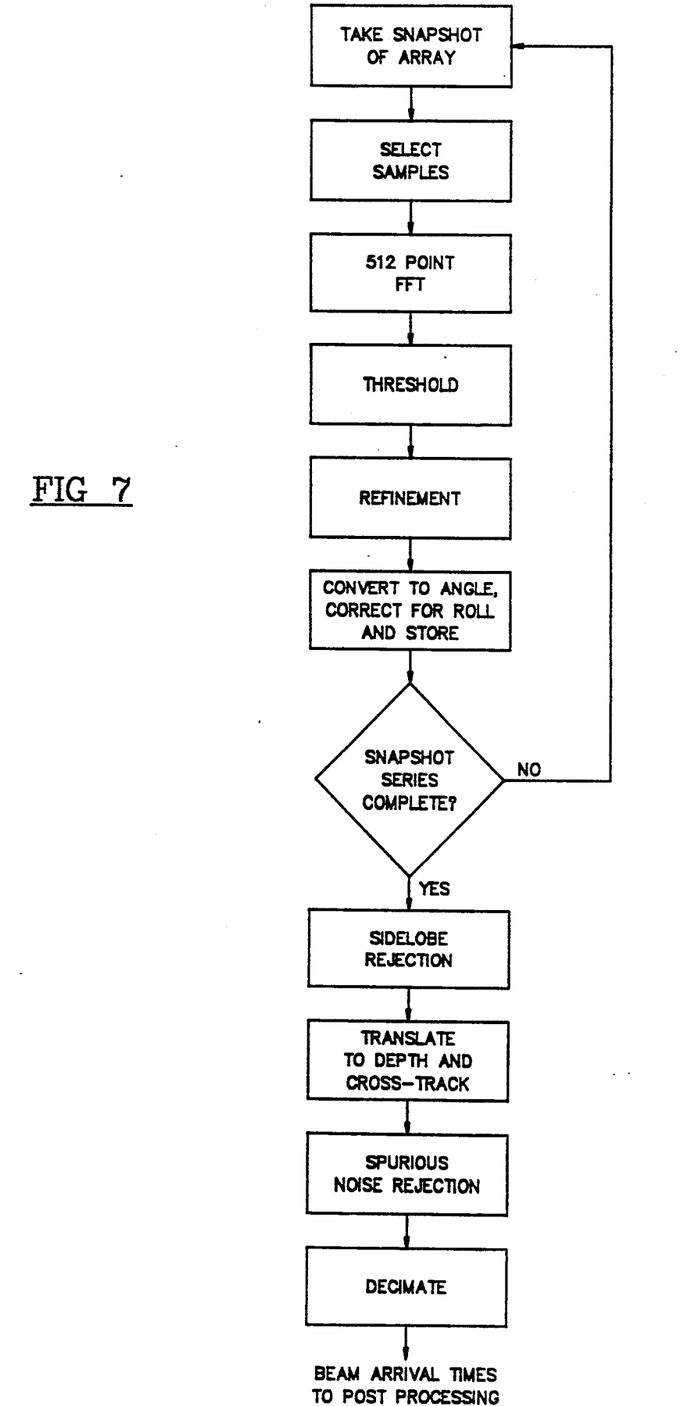
FIG. 7 is a flow diagram illustrating another method of processing the sampled and digitized outputs of the sonic detector array.

FIG. 7 illustrates another approach to the determination of the ocean bottom profile. While the approach of FIG. 5 has only been tested in the laboratory, the approach of FIG. 7 has been tested in an ocean environment. Again, simultaneous samples or "snapshots" are taken, at 3 millisecond intervals, of the echo return signals as detected by the 144 detector array shown in FIG. 1. An array focusing step (not shown in FIG. 7) may be carried out before proceeding to the next step.

While all of the snapshot data is stored, not all of the snapshots corresponding to a given sonic pulse are processed. Rather, the ocean bottom is divided into a number (typically 255) of equiangular windows, and snapshots are selected, in a SELECT SAMPLES step, in accordance with a sequence which provides a predetermined number of snapshots for each window. The number and sequence of snapshots selected for processing is determined according to the operating depth.

The Fast Fourier Transform calculations are carried out in the FFT step, as in FIG. 5. However, unlike the process in FIG. 5, in FIG. 7 the port and starboard sides of the spectrum produced by the FFT are processed together rather than separately, and the FFT contains 512 points rather than 256.

In a THRESHOLD step, a noise threshold is established by determining the average amplitude of the FFT spectrum. The threshold level is set to 2 dB above this average, which, in practice, is approximately 2 dB above the noise level. FFT bin amplitudes which are above the threshold are passed on for further processing. At this stage, there are 512 bins in the FFT output data, some of which have peaks exceeding the threshold. Here, as in FIG. 5, the positions of the true peaks for a given snapshot are initially known only to a degree of precision corresponding to the bin width.

The next step is a REFINEMENT step in which the true positions of the peaks in the FFT data are determined. The position of each peak is determined with greater precision by fitting a curve to the amplitudes for bins having peak amplitudes and a predetermined number of bins on both sides thereof. This curve fitting makes it possible to determine the true position of each peak of the curve. The curve fitting technique considered most suitable is a five point, parabolic, least squares curve fit.

Roll correction next takes place for each snapshot, and the selected and refined snapshot data is stored in a STORE operation, in its appropriate window, of the 255 equiangular windows. If two or more peaks fall in one window, only the strongest peak is retained in that window. This helps to eliminate noise and sidelobe interaction.

In an SIDELOBE REJECTION step, a determination is made of which windowed points are to be dropped as noise. A sliding mean having a predefined width, e.g. nine windows wide, is used to compare each of the windowed points to the mean amplitude of the points surrounding it. If the amplitude of a point under inspection is below the product of a predetermined noise threshold and the mean amplitude of the points in the region surrounding it, the point is dropped.

Following the SIDELOBE REJECTION STEP, the data set is converted from angle/time/amplitude format to bottom points defined by depth and cross-track distance.

In a SPURIOUS NOISE REJECTION step, linear regression is first used to determine the overall bottom slope from the depth and cross-track data. The overall bottom slope is then used to determine the slope rejection tolerances, so that, if the slope at any location exceeds a predetermined tolerance, as adjusted by the overall bottom slope, the point or points responsible for the out of tolerance slope measurement are rejected. More specifically, the SPURIOUS NOISE REJECTION step establishes two tolerances $TOL_1$ and $TOL_2$. $TOL_1$ is 30° plus the overall bottom slope. $TOL_2$ is 60° plus the overall bottom slope. A point-to-point slope computation is made for all of the points in the bottom profile data set. If $TOL_2$ is exceeded, the point responsible is rejected. If $TOL_1$ is exceeded, but $TOL_2$ is not exceeded, the next two points and the preceding point are examined to determine whether an uphill or downhill trend is present. If a bottom feature is present, the points are accepted (up to the $TOL_2$ limit).

If it is determined that a point should be rejected, the last four points are averaged to determine the local mean depth, and the point farthest from the local mean depth is rejected.

The SPURIOUS NOISE REJECTION STEP processes the ocean bottom profile in two passes. First, from approximately 20° on the port side, it proceeds across the center area and through the starboard side points. Then, from 20° on the starboard side, it passes through the center area again and processes all the port side points. Since the data integrity in the neighborhood of 20° is usually good, while the center area is one of the noisiest, the center area is given a second pass.

Following the SPURIOUS NOISE REJECTION step, a DECIMATE step is carried out, which performs amplitude computation, and low pass filtering on the bottom point data set by means of a 3-point sliding mean. In the DECIMATE step, the data are converted back to angle/time/amplitude format. The final amplitudes are computed, and the data are interpolated to produce 91 beams, one for each degree of angle from −45° to +45°, including 0°. Interpolation is limited so that if no data appears in a preset number of contiguous windows, the output beams corresponding to those windows are determined to be zero. For example, if 255 windows are used, and the interpolation limit is set to ten windows, and no data appears in the 3.5 degrees corresponding to those ten windows, the corresponding beams are determined to have zero amplitudes.

Following the DECIMATE STEP, angle, time and amplitude data are passed on for further processing.

It will be apparent from the foregoing that the invention, by utilizing repeated snapshot-like samples of the outputs of a sonic detector array, and digital processing, is able to scan the ocean bottom in a wide swath, and determine ocean bottom profiles rapidly and with high resolution.

Many modifications and variations of the invention are possible in view of the above disclosure. For example instead of using the Fast Fourier Transform (FFT), other spectrum estimation techniques can be used, including the Maximum Entropy methods (both Burg and Least Squares Formulation) and the Extended Prony Method. It is possible to overcome near field effects in the sampling stage by non-simultaneous sampling to provide effective flattening of the arriving wavefront. Depending on further processing, the output can take various forms, such as two-dimensional topographic maps, or three-dimensional relief maps. Still other modifications will occur to persons skilled in the art, and it is therefore to be understood that within the scope of the appended claims, the invention may be practiced otherwise than as specifically described.

We claim:

1. A method of digitally mapping the contour of the floor of a body of water comprising the steps of:

projecting a sonic pulse into said body of water toward said floor, for a vessel proceeding in a first direction in said body of water, in a wide swath, fun-shaped beam having a wide dimension in a direction transverse to said first direction, and having a narrow dimension in said first direction, thereby insonifying a narrow area of said floor elongated in said transverse direction, said sonic pulse comprising multiple oscillations taking place continuously over a pulse interval sufficiently short that, for each pulse, at least one insonified spot moves outward in said narrow area over a range extending from a point directly underneath said vessel to a location spaced horizontally from said point by a distance approximately equal to the depth of said point, and said insonified spot, at any given instant of time, occupies only a portion of said range;

receiving an echo of said pulse by means of an array of sonic detectors propelled along with said vessel and arranged in a series along a line transverse to said first direction;

during the return of the echo of said pulse to the array of sonic detectors, repeatedly taking sets of simultaneous, instantaneous samples of outputs of said sonic detectors, the sample for each detector consisting of a representation of the amplitude of the echo, as received by the detector, at an instant of time, and each set of samples being derived from backscatterd energy emanating from at least one limited area on said floor and within said narrow area;

by applying a beam-forming transform to each set of samples, determining the direction, relative to the detector array, of each said limited area on said floor from which the backscattered energy corresponding to the set of samples emanates;

determining, for each set of samples, the time interval between the projection of said sonic pulse into the body of water and the return of the echo of said sonic pulse to the detector array; and calculating coordinates of each said limited area corresponding to each set of samples from the direction and time interval determined for the set.

2. The method according to claim 1 in which, as the vessel proceeds in said first direction, said projecting, receiving and sample taking steps are repeated, and in which said direction determining, time interval determining and calculating steps are repeated for each repetition of the projecting, receiving and sample taking steps.

3. The method according to claim 1 in which the duration of said sonic pulse is sufficiently long that, at any instant of time during the outward movement of said insonified spot within said narrow floor area, backscattered energy emanates from at least a portion of said spot which simultaneously energizes all of the detectors in said array.

4. The method according to claim 1 in which the step of determining direction by applying a beam-forming transform to each set of samples includes the steps of producing, for each set of samples, a representation of a function having an amplitude varying with direction, and determining the direction of said limited area on said floor for each set of samples by selecting peaks from a group of peaks in said function.

5. The method according to claim 1 in which the step of determining direction by applying a beam-forming transform to each set of samples includes the steps of producing, for each set of samples, a representation of a function having an amplitude varying with direction, establishing a noise threshold for said function, and determining the direction of said limited area on said floor for each set of samples from one or more peaks in said function the amplitudes of which exceed said threshold.

6. The method according to claim 1 in which the step of determining direction by applying a beam-forming transform to each set of samples includes the steps of producing, for each set of samples, a representation of a function having an amplitude varying with direction, establishing a noise threshold for at least a portion of said function corresponding to a range of directions, and determining the direction of said limited area on said floor from one or more peaks in said portion of the function the amplitudes of which exceed said noise threshold; and including the step of discarding said portion of said function when none of the peaks in said portion of said function exceeds said noise threshold.

7. The method according to claim 1 in which the step of determining direction by applying a beam-forming transform to each set of samples includes the steps of establishing, by means of said beam-forming transform, a separate amplitude value for each direction of a set of discrete directions, and determining the direction of said limited area on said floor, for each set of samples, by selecting the direction in said set of discrete directions, having the highest amplitude value.

8. The method according to claim 1 in which said samples are digitized, and in which the steps of determining direction and calculating coordinates are carried out by digital computing means.

9. The method according to claim 1 in which the step of determining direction by applying a beam-forming transform to each set of samples includes the steps of producing, for each set of samples, a representation of a function having an amplitude varying with direction, and determining the direction of a point in said limited area on said floor for each set of samples by interpolation of the data represented by a group of peaks in said function.

10. The method according to claim 1 in which, in the step of determining direction by applying a beam-forming transform to each set of samples, the overall range of directions of points within said narrow floor area relative to said array is divided into a series of bins, each bin corresponding to a subrange of directions, and having an amplitude; in which the bin having the maximum amplitude is determined; in which, for a continuous portion of said narrow floor area, the amplitude in the bin having the maximum amplitude is compared with the amplitudes in the adjacent bins on both sides thereof; and in which the direction of a point within said limited area of the floor is determined with greater precision than the bin width by positioning the true direction within the bin having the maximum amplitude on the side of the center of said bin toward the one of the adjacent bins having the greater amplitude.

11. The method according to claim 1 in which the overall range of angular directions of points within said narrow floor area relative to said array is divided into sectors, each sector having a range encompassing multiple sets of samples, and in which for each sector, one set of samples from the multiple sets encompassed by the range of said sector is selected.

12. The method according to claim 1 including the step of determining, for each set of samples, the roll angle of the vessel at the time the set of samples was taken, and correcting the direction, as determined by application of the beam-forming transform to each set of samples, by the magnitude of the roll angle for that set.

13. The method according to claim 1 in which the directions determined for said sets of samples are determined as beam arrival angles measured relative to a vertical direction directly underneath the vessel, and including the steps of comparing the beam arrival angles determined for successively taken sets of samples, and, when a beam arrival angle determined for one set of samples is less than the beam arrival angle for a preceding set by a predetermined amount, discarding the sets of samples for said pulse taken prior to said one set of samples.

14. The method according to claim 1 in which, in the step of determining direction by applying a beam-forming transform to each set of samples, the overall range of directions of points within said narrow floor area relative to said array is divided into a series of bins, each bin corresponding to a subrange of directions and having an amplitude; in which the bin having the maximum amplitude is determined; in which the amplitude in the bin having the maximum amplitude and the amplitudes in a predetermined number of bins on both sides thereof are determined; and in which, the direction of a point within said limited area of the floor is determined with greater precision than the bin width by fitting a curve to the amplitudes of each bin having the maximum amplitude and said predetermined number of bins on both sides thereof, and positioning the true direction at the peak of said curve.

15. The method according to claim 14 in which said curve fitting step is carried out by a least squares curve fit using a parabolic curve.

16. The method according to claim 1 including the steps of producing, by means of said beam-forming transform, a set of data, in the form of amplitudes and angle pairs; dividing the overall range of directions of points within said narrow floor area relative to said array into a series of windows, each window corresponding to a subrange of directions; selecting from said set of data, an amplitude and angle pair for each of said windows; determining a sliding average of the amplitudes for said windows; and discarding amplitude and angle pairs in said windows the amplitudes of which do not exceed a value having a predetermined relationship to the sliding average.

17. The method according to claim 1 in which the coordinates determined in said calculating step are depth and cross-track distance; and including the steps of determining an overall slope trend in said narrow floor area by applying a linear regression to said coordinates, determining the slopes of subareas within said narrow floor area by comparing coordinates calculated for successive sets of samples, establishing a slope tolerance value by adding to a predetermined tolerance, the overall slope trend, and, when the slope of a subarea is determined to exceed said predetermined tolerance, determining the local mean depth at the location of said subarea from a predetermined number of coordinates determined for the vicinity of said area, and rejecting the coordinates, from said predetermined number of coordinates, which have a depth farthest from said local mean depth.

18. A method of digitally mapping the contour of the floor of a body of water comprising the steps of:

projecting a sonic pulse into said body of water toward said floor, from a vessel proceeding in a first direction in said body of water, in a wide swath, fan-shaped beam having a wide dimension in a direction transverse to said first direction, and having a narrow dimension in said first direction, thereby insonifying a narrow area of said floor elongated in said transverse direction and extending in both the port and starboard directions relative to said vessel, said sonic pulse comprising multiple oscillations taking place continuously over a pulse interval sufficiently short that, for each pulse, two insonified spots move outward in said narrow area, in port and starboard directions respectively over ranges extending from a point directly underneath said vessel to locations on both sides of said point, each of said locations being spaced horizontally from said point by a distance approximately equal to the depth of said point, and each of said insonified spots, at any given instant of time, occupies only a portion of the range over which it moves outward;

receiving an echo of said pulse by means of an array of sonic detectors propelled along said vessel and arranged in a series along a line transverse to said first direction;

during the return of the echo of said pulse to the array of sonic detectors, repeatedly taking sets of simultaneous, instantaneous samples of outputs of said sonic detectors, the sample for each detector consisting of a representation of the amplitude of the echo, as received by the detector, at an instant of time, and each set of samples being derived from backscattered energy emanating from a pair of limited areas, on said floor and within said narrow area, on the port and starboard sides of the vessel respectively;

by applying a beam-forming transform to each set of samples, determining the directions, relative to the detector array, of the pair of limited areas on said floor from which the backscattered energy corresponding to the set of samples emanates;

determining, for each set of samples, the time interval between the projection of said sonic pulse into the body of water and the return of the echo of said sonic pulse to the detector array; and calculating coordinates of the limited areas corresponding to each set of samples from the directions and time interval determined for the set.

19. A system for mapping the contour of the floor of a body of water comprising:
(a) means for producing a sonic pulse and for projecting said sonic pulse into said body of water toward said floor, from a vessel proceeding in a first direction in said body of water, in a wide swath, fan-shaped beam having a wide dimension in a direction transverse to said first direction, and having a narrow dimension in said first direction, thereby insonifying a narrow area of said floor elongated in said transverse direction, said sonic pulse comprising multiple oscillations taking place over an interval sufficiently short that for each pulse, an insonified spot moves outward in said narrow area over a range extending from a point directly underneath said vessel to a location spaced horizontally from said point by a distance approximately equal to the depth of said point, and said insonified spot, at any given instant of time, occupies only a portion of said range;
(b) means, comprising an array of sonic detectors arranged for propulsion along with said vessel in a series along a line transverse to said first direction, for receiving an echo of said pulse, each detector producing an output representative of the amplitude of the echo, as received by the detector; and
(c) processing means responsive to the echo, as received by the array of sonic detectors, for producing data representative of the contour of said floor within said narrow area, said processing means comprising: sampling means for repeatedly taking sets off simultaneous, instantaneous samples of the outputs of said sonic detectors; means for applying a beam-forming transform to each of the sets of simultaneously taken samples for determining the direction, relative to said array of sonic detectors, of a limited area on said floor from which backscattered energy corresponding to the set of samples emanates; means for determining, for each set of simultaneous samples, the time interval between the projection of said sonic pulse into the body of water and the return of the echo of said sonic pulse to the detector array; and means for calculating, for each set of simultaneous samples, the coordinates of the limited area corresponding to said set of samples from the direction and time interval determined for the set of samples.

20. The method according to claim 1 in which, the step of determining direction by applying a beam-forming transform to each set of samples, includes the steps of:

producing, for each set of samples, a representation of a function having an amplitude varying with direction;

establishing a noise threshold for said function; and determining the direction of said limited area on said floor for each set of samples from one or more peaks in said function the amplitudes of which peaks exceed said noise threshold, by:
(a) dividing the overall range of directions of points within said narrow floor area relative to said array into a series of bins, each bin corresponding to a subrange of directions,
(b) determining the amplitude of the function for the subrange of directions corresponding to each bin;
(c) determining the bin having the maximum amplitude;
(d) for a continuous portion of said narrow floor area, comparing the amplitude in the bin having the maximum amplitude with the amplitudes in the adjacent bins on both sides thereof; and
(d) positioning the true direction within the bin having the maximum amplitude on the side of the center of said bin toward the one of the adjacent bins having the greater amplitude.

21. The method according to claim 20 in which, as the vessel proceeds in said first direction, said projecting, receiving and sample taking steps are repeated, and in which said direction determining, time interval determining and calculating steps are repeated for each repetition of the projecting, receiving and sample taking steps.

22. The method according to claim 20 in which the duration of said sonic pulse is sufficiently long that, at any instant of time during the outward movement of said insonified spot within said narrow floor area, backscattered energy emanates from at least a portion of said spot which simultaneously energizes all of the detectors in said array.

23. The method according to claim 20 in which the step of establishing a noise threshold for said function is carried out by establishing a noise threshold for at least a portion of said function corresponding to a range of directions, and including the step of discarding said portion of said function when none of the peaks in said portion of said function exceeds said noise threshold.

24. The method according to claim 20 in which said samples are digitized, and in which the steps of determining direction and calculating coordinates are carried out by digital computing means.

25. The method according to claim 1 in which the overall range of angular directions of points within said narrow floor area relative to said array is divided into sectors, each sector having a range encompassing multiple sets of samples, and in which for each sector, one set of samples from the multiple sets encompassed by the range of said sector is selected.

26. The method according to claim 1 in which, the step of determining direction by applying a beam-forming transform to each set of samples, includes the steps of:

producing, for each set of samples, a representation of a function having an amplitude varying with direction;

establishing a noise threshold for said function; and determining the direction of said limited area on said floor for each set of samples from one or more peaks in said function the amplitudes of which peaks exceed said noise threshold, by:

(a) dividing the overall range of directions of points within said narrow floor area relative to said array into a series of bins, each bin corresponding to a subrange of directions and having an amplitude;

(b) determining the amplitude of the function for the subrange of directions corresponding to each bin;

(c) determining the bin having the maximum amplitude;

(d) determining the amplitudes in a predetermined number of bins on both sides of the bin having the maximum amplitude; and (e) determining the direction of a point within said limited area of the floor with greater precision than the bin width by fitting a parabolic curve to the amplitudes of each bin having the maximum amplitude and said predetermined number of bins on both sides thereof by a least squares curve fit, and positioning the true direction at the peak of said curve; and as the vessel proceeds in said first direction, repeating said projecting, receiving and sample taking steps, and repeating said direction determining, time interval determining and calculating steps for each repetition of the projecting, receiving and sample taking steps.

27. The method according to claim 18 in which, the step of determining directions by applying a beam-forming transform to each set of samples, includes the steps of:

producing, for each set of samples, a representation of a function having an amplitude varying with direction;

establishing a noise threshold for said function; and determining the directions of said limited areas on said floor for each set of samples from one or more peaks in said function the amplitudes of which peaks exceed said noise threshold, by:

(a) dividing the overall range of directions of points within said narrow floor area relative to said array into a series of bins, each bin corresponding to a subrange of directions, (b) determining the amplitude of the function for the subrange of directions corresponding to each bin;

(c) determining the bin having the maximum amplitude for each of the port and starboard sides of the vessel;

(d) for a continuous portion of said narrow floor area on both the port and starboard sides of the vessel, comparing the amplitude in the bin having the maximum amplitude with the amplitudes in the adjacent bins on both sides thereof; and (d) positioning the true direction within each bin having the maximum amplitude on the side of the center of the last-mentioned bin toward the one of its adjacent bins having the greater amplitude.

* * * * *